July 4, 1972  B. M. CHAPMAN  3,674,367
METHOD FOR HANDLING AND POSITIONING FILM Filed June 15, 1970  5 Sheets-Sheet 1

INVENTOR
BRIAN M. CHAPMAN
BY
Brumbaugh, Graves, Donohue & Raymond
his ATTORNEYS

INVENTOR
BRIAN M. CHAPMAN
BY
Brumbaugh, Graves, Donohue & Raymond
his ATTORNEYS

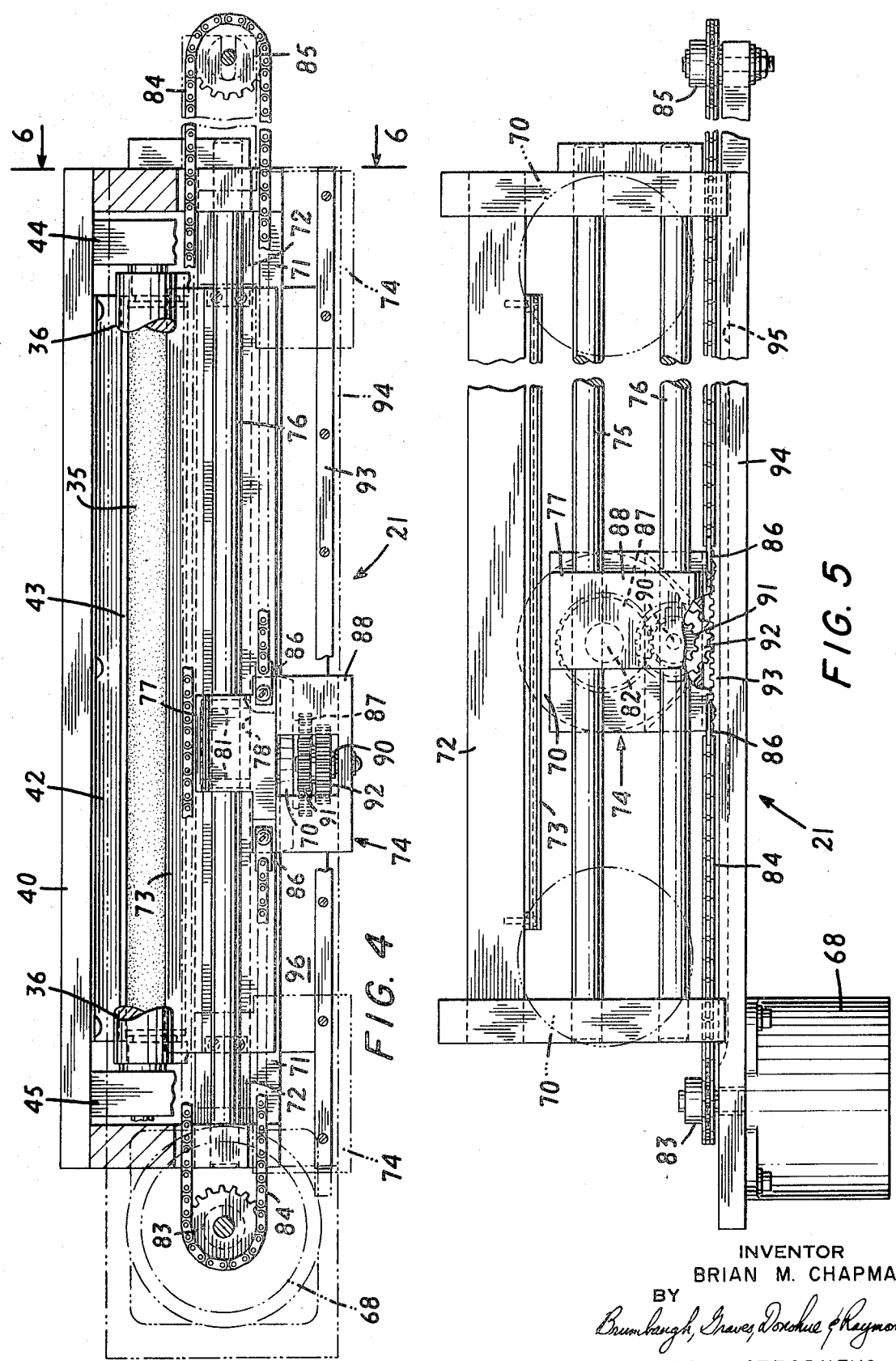

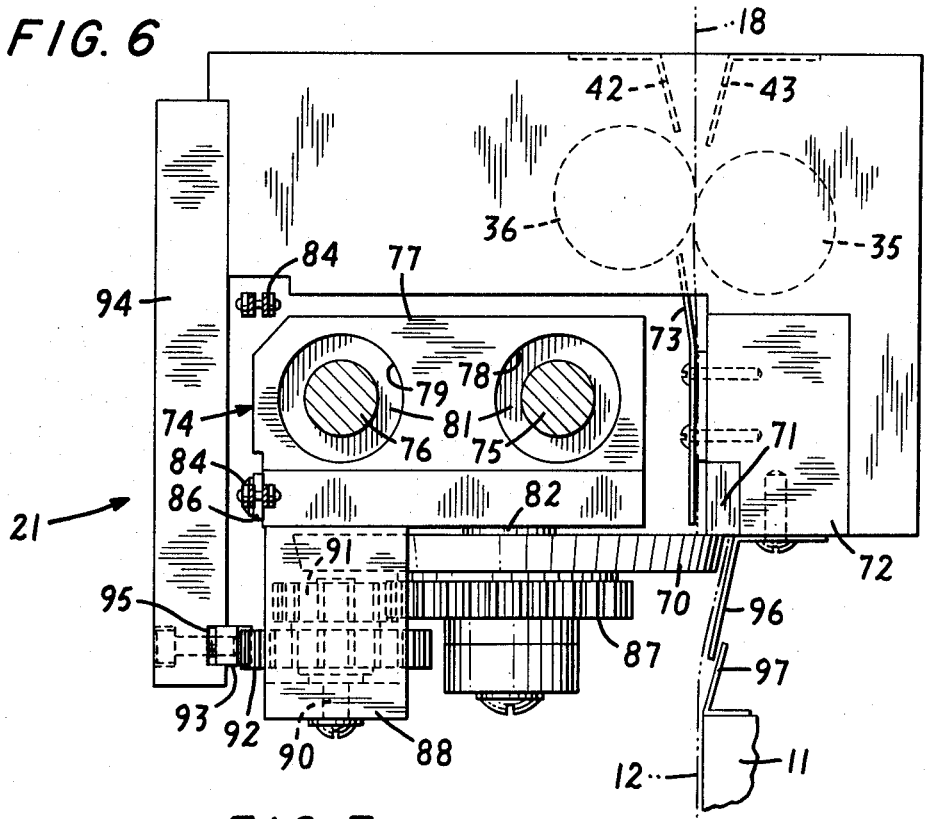
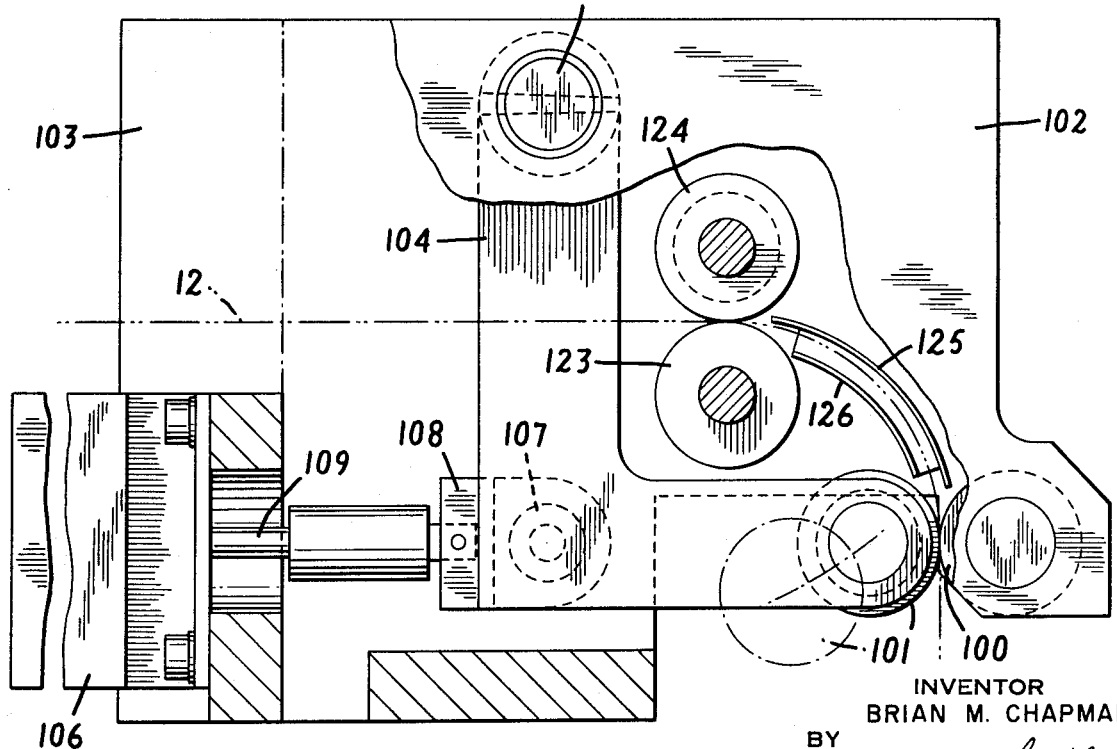

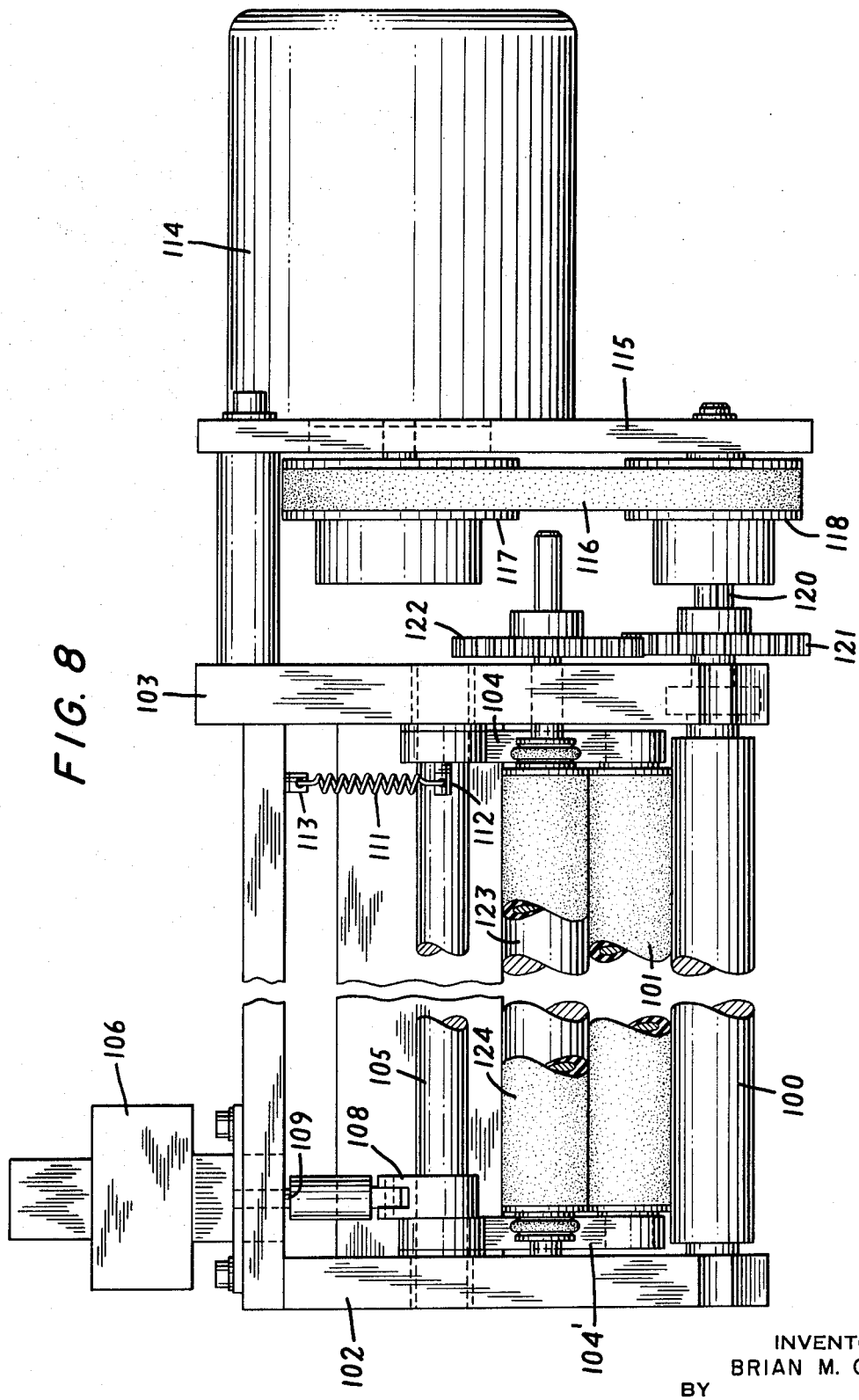

United States Patent Office 3,674,367
Patented July 4, 1972

3,674,367
METHOD FOR HANDLING AND POSITIONING FILM

Brian M. Chapman, Trumbull, Conn., assignor to Time Incorporated, New York, N.Y.
Filed June 15, 1970, Ser. No. 46,411
Int. Cl. G03b 27/58; G03c 5/08
U.S. Cl. 355—77  14 Claims

ABSTRACT OF THE DISCLOSURE

A film handling arrangement which repeatedly positions film for selective exposure in a photocomposition process. A film feed uses pulse motor driven pinch rolls to withdraw a precise film length from a supply. A rotary knife crosses and severs the film, applying forces only perpendicular to the film to avoid damaging the film. Movable in mutually perpendicular X and Y directions, a vacuum platen seizes the length of film just before it is severed and, following cutting, precisely positions the film for exposure by a cathode ray tube. For each exposure, the platen is positioned by mutually perpendicular precision lead screws driven by X and Y positioning pulse motors. When all desired information has been recorded by repeated exposures, the platen moves directly beneath a film export device. A pair of film export pinch rolls closes upon a free film edge and withdraws the film for storage or further processing.

BACKGROUND OF THE INVENTION

This invention relates to film handling methods and apparatus and more particularly to methods and apparatus for feeding and positioning film for photocomposition.

Recent developments in photocomposition processes make possible fast composition of text by exposure of film sections to a cathode ray tube. In one such arrangement, a computer input to the cathode ray tube allows the desired text to be composed in advance, stored electrically and then fed to the cathode ray tube for automatic reproduction upon properly positioned sections of film. With the desired text recorded on the film, the film is then processed and employed to produce printing plates or the like, suitable for the final printing process. The development of high speed photocomposition processes of this type now requires cooperable film handling methods and apparatus capable of meeting the relatively high speed film feeding, positioning, and exporting demands of the associated cathode ray tube control provisions.

Also, computer control of the cathode ray tube in the fashion described makes desirable a film positioning and handling arrangement which also is capable of being controlled by the output of the previously programmed computer. Accurate film positioning provisions, capable of precise positioning in mutually perpendicular directions, are desired for the completion of lines of text with accurate line to line spacing (leading) and accurate margin widths, column spacing, etc. Pulse operation affords the capability of computer control with the exact film location determined, in each direction, by the number of supplied pulses.

Cooperating film feeding and exporting provisions should function repeatedly, on command, quickly to supply and withdraw film. During feeding, the exact film length should be fed for correctly locating the film with respect to the positioning apparatus. This length should then be severed without damage. After the composition process the exposed film should automatically move away for further processing.

Film positioners for older, conventional photocomposition processes have, of course, been known for some time. Typically however, these were not designed to meet the demands of a computer driven cathode ray tube film exposure system. Nor were they designed to be suitable for computer control by a computer programmed also to control the reproduction of text by a cathode ray tube.

SUMMARY OF THE INVENTION

In view of the foregoing, it is an object of this invention to provide a film handling and positioning arrangement suitable to meet the demands of a cathode ray tube exposure system controlled from a programmed computer as just described.

Another object of the invention is the provision of methods and apparatus capable of quickly supplying the film, repeatedly and accurately positioning the film for exposure, and quickly withdrawing the film.

It is an additional object of this invention to provide film positioning apparatus, pulse operated to position film segments precisely for prescheduled exposure.

Yet another object is the achievement of film handling methods and apparatus which are, themselves, suitable for computer control.

An additional object of the invention is the provision of a film cutting knife cooperable with a film feed to sever a length of film from a film supply with little or no film damage.

Although the methods and apparatus according to the invention are provided to meet the requirements for computer control, computers fit for the task are well known and require no description here. The computer, as such, forms no part of the invention. Computer control of machine functions is a common practice which employs computer regulation and scheduling of electrical control signals.

Similarly, computer operation of a cathode ray tube to reproduce an earlier programmed text does not, per se, form a part of the instant invention. For this, various computer controlled photocomposition systems are known.

The above and other objects of the invention as may hereinafter appear will be more clearly understood with reference to the detailed description of the preferred embodiments, the associated drawings, and the appended claims.

In the drawings:

FIG. 4 is a fragmentary front elevational view showing a film severing rotary knife and its drive.

FIG. 5 is a fragmentary top plan view of the knife of FIG. 4 and shows a knife support carriage, movable along guide bars by a chain drive.

FIG. 6 is a sectional view taken along the line 6—6 of FIG. 4, and illustrates the rotary knife and associated knife rotation rack and gear connections.

FIG. 7 is a side elevational view with parts broken away for clarity, and shows the film exporting provisions which include a pivotable pinch roll, solenoid operated to grasp and withdraw the film.

FIG. 8 is a fragmentary top plan view of the film exporting provisions, showing the pinch rolls and their drive connections.

DESCRIPTION OF PREFERRED EMBODIMENT

Figure 1:
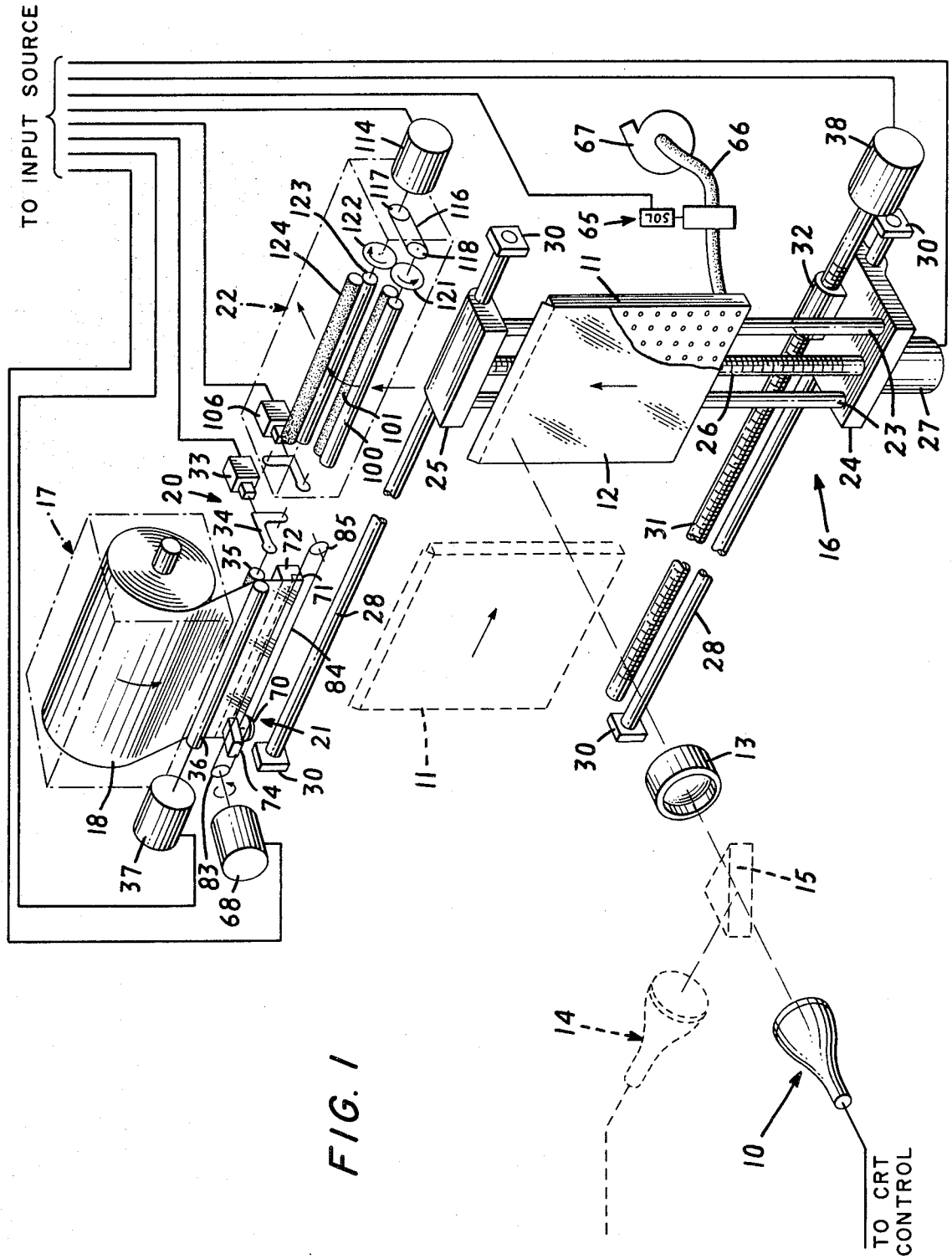
FIG. 1 is an exploded diagrammatic illustration of film handling and positioning apparatus which includes film feeding, film positioning, and film exporting provisions.

In FIG. 1, the novel film handling and positioning method and apparatus are illustrated diagrammatically. A cathode ray tube 10 faces a vacuum platen 11 which supports a film segment 12. The cathode ray tube preferably is computer controlled for the reproduction of programmed text serially to expose portions of the film segment 12 through an appropriate lens or optic system 13. The position of the cathode ray tube may vary. One of a number of alternate tube positions is shown in broken lines at 14 in cooperation with a prism 15. Off-axis mounting in this fashion may also be used to accommodate an increased number of cathode ray tubes for simultaneously exposing separate portions of film segment 12, thereby to increase the speed with which text is composed.

An X–Y positioner 16 supports the vacuum platen 11. The positioner 16 provides platen movement in two mutually perpendicular directions, the X and Y directions, to locate accurately the portion of the film segment 12 for exposure each time the tube 10 reproduces information to be recorded. The X–Y positioner 16 also initially locates the platen 11 for film loading. A cassette 17 or other suitable film store houses a continuous length of unexposed film 18. A film feed 20, and a film cutter 21 load a carefully measured length of film onto the platen 11.

Once the desired text is fully recorded on the film segment 12, the positioner 16 locates the platen 11 directly beneath a film export device 22 for unloading. Here, the film segment 12 is withdrawn and either stored or transported directly for further processing.

The X–Y positioner 16 which supports and positions the platen 11 may be a specially modified, commercially available positioner. A pair of guide bars 23 extend between end plates 24 and 25. Vacuum platen 11 slides in the Y direction along the bars 23 when driven by a precision lead screw 26. A commercially available pulse motor 27 completes the Y direction drive.

For movement in the X direction, a further pair of guide bars 28 extend perpendicular to the bars 23 and the lead screw 26. Support members 30 mount the X direction guide bars 28 at their ends. Each of the end plates 24 and 25 receives a bar 28 in a bore for sliding movement of the plate on the bar. A further precision lead screw 31 engages an internally threaded boss 32 on the end plate 24 to provide the X direction drive of the platen 11 upon energization of an associated pulse motor 38.

In operation, the platen 11 is positioned initially directly below the cassette 17, the feed 20, and the cutter 21, as shown in broken lines in FIG. 1. For the first of a number of operating cycles, the cassette must be mounted in place atop the film feed 20. Energization of a solenoid 33 pivots a pair of pivotable brackets 34 and 34′ which support one of a pair of film feed pinch rolls 35 and 36. The free film end of the undeveloped film 18 is inserted between and slightly beyond the now separated pinch rolls 35 and 36 to the line along which film is cut in subsequent cycles. The solenoid 33 releases the brackets 34 and 34′ and closes the rolls 35 and 36 on the film end. A pulse motor 37 drives the roll 36 and withdraws an exact length of film from the cassette 17.

The length of film withdrawn is proportional to the number of electrical pulses supplied to the motor 37. Thus, the number of pulses supplied is selected for the size of the page or sheet ultimately to be printed. For computer control, the number of pulses required for a particular publication may be stored, retrieved, and applied to the motor 37 in response to a general instruction. With each subsequent cycle, then, the exact length of film will be withdrawn automatically.

Figure 2:
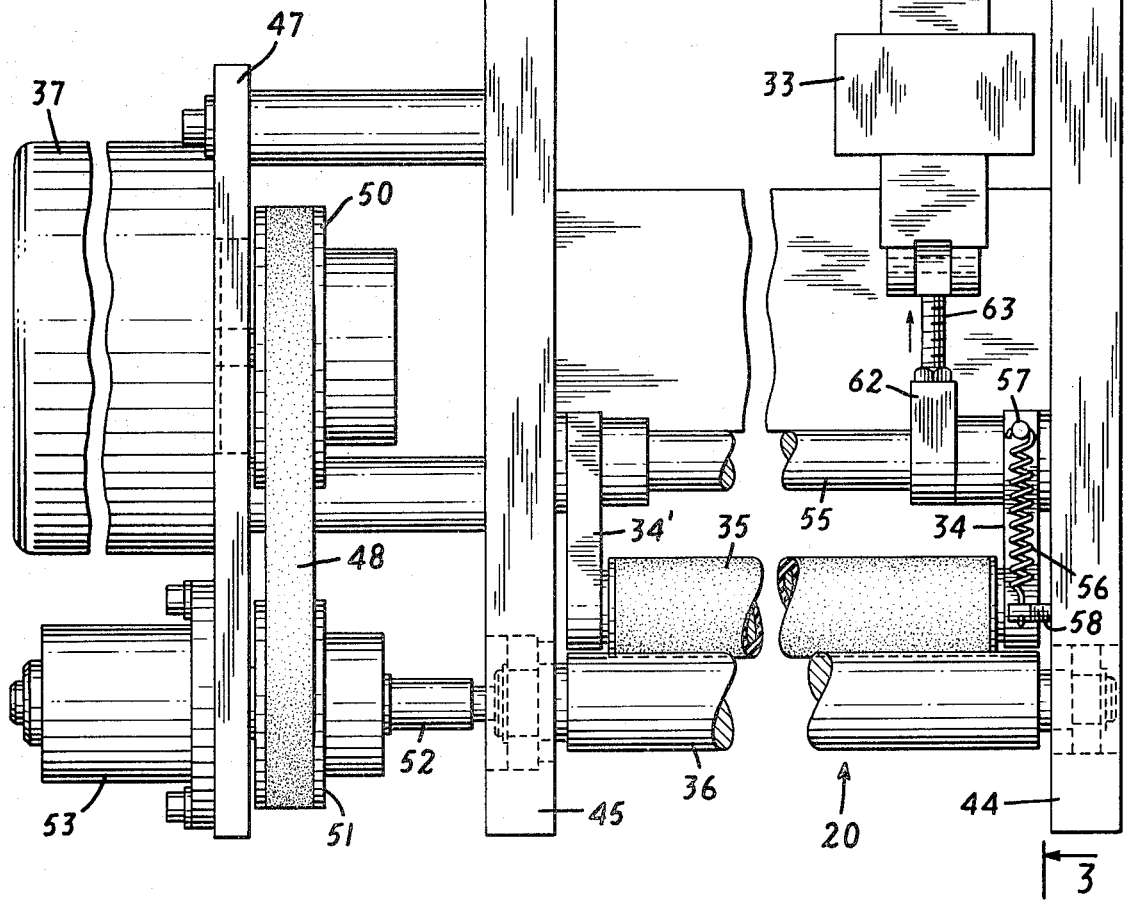
FIG. 2 is a fragmentary top plan view of the film feeding provisions.
Figure 3:
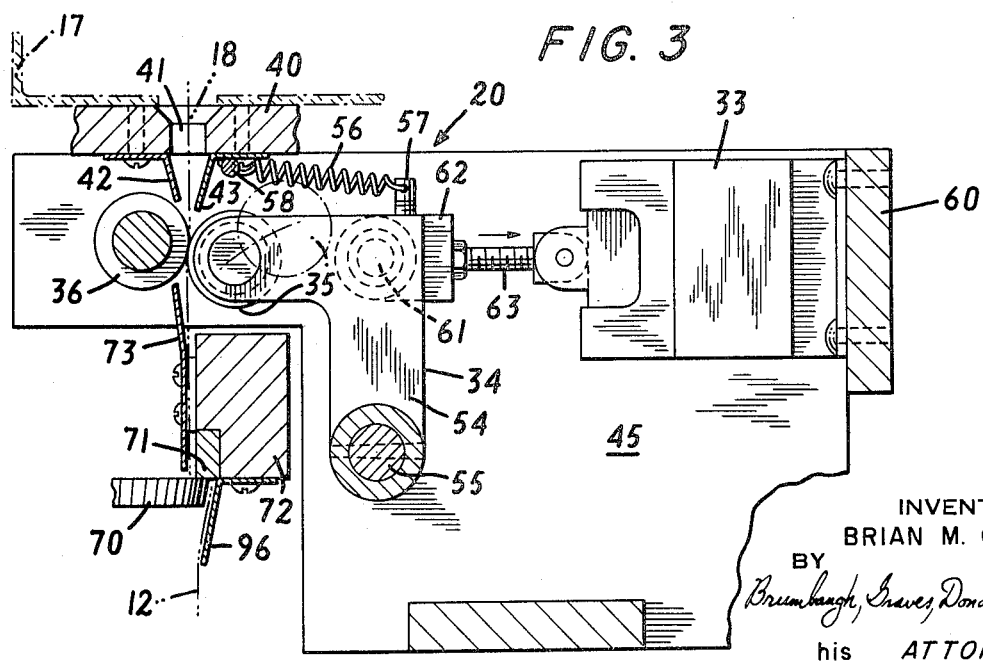
FIG. 3 is a sectional view, taken along the line 3—3 of FIG. 2, and shows the cooperation of a pivotally supported pinch roll and a solenoid which facilitate initial film loading.

FIGS. 2 and 3 show the film input arrangement 20 most clearly. An upper plate 40 (FIG. 3) lies intermediate the cassette 17 and the film feed rolls 35 and 36. A slot 41 in the plate 40 extends parallel the rolls. A pair of guides 42 and 43 converge toward the nip of the rolls 35 and 36. The guides 42 and 43 are affixed to the plate 40 and extend the length of the slot 41. Film 18 from the cassette 17 passes through the slot 41 to the rolls 35 and 36.

The roll 36 is a metal drive roll supported between a pair of end plates 44 and 45. Suitable bearings mount the roll 36 at the plates 44 and 45. The pulse motor 37 drives the roll 36 via a belt drive. A motor support plate 47 mounts the motor 37 a short distance from the roll supporting end plate 45. Between the plates 45 and 47, a belt 48 spans a pair of belt drive pulleys 50 and 51 which are supported upon the pulse motor output shaft and a drive shaft 52, respectively. If desired, conventional tension adjustment may be provided by an adjustable roll bearing on the belt. The drive shaft 52 is supported at its outer end by a suitable bearing assembly 53 and, at its other end, the shaft 52 is keyed or attached to the roll 36 to drive the pinch rolls.

The pulse motor 37 is any of a number of commercially available accurate pulse motors which provide a fixed predetermined partial rotation of their output shaft when an appropriate pulse is applied thereto. The diameters of pulleys 50 and 51 are selected to give just the desired degree of rotation of the drive pinch roll 36, per pulse. For fastest operation of the pulse motor 37, to allow very quick film loading onto the vacuum platen, the motor 37 may be supplied a train of pulses in an accelerated schedule for maximum acceleration of the motor to its maximum speed. Pulse motor suppliers commonly recommend pulse schedules to this end.

The initial film loading operation, used when a fresh cassette 17 is required, is best understood with reference to FIG. 3. The bracket 34 is a generally L-shaped member with one arm 54 pivotally attached to the end plate 44 by a pivotable support shaft 55, affixed to the arm 54 and partly rotable in suitable bearings in the plate 44. At its other end, the bracket 34 supports one end of the pinch roll 35. A return spring 56 biases the roll 35 into engagement with the film between the rolls. The spring 56 extends between a first stud 57, affixed to the bracket 34, and a second stud 58, affixed to the end plate 44. The remaining pivotable bracket 34′, supporting the roll 35 at its other end, is like bracket 34 and may also, if desired, be spring biased.

The solenoid 33 extends from a back plate 60, where it is supported, toward the central corner of the L-shaped bracket 34, where a further shaft 61 is connected with the bracket. A connector 62 engages the shaft 61, connecting the bracket 34 with a solenoid actuated drive bar 63. Energization of the solenoid 33, then, pivots bracket 34 against the bias of the spring 56, holding the rolls 35 and 36 open until the film feed is loaded.

Once the film feed is loaded, the correct number of pulses applied to the motor 37, and the exact amount of film positioned just in front of the vacuum platen 11, a signal to a suitable electrically operable valve 65 opens a vacuum line 66 between the platen 11 and a vacuum source 67. The film segment 12 is then held fast to the platen 11 as the film cutter 21 servers the desired length of film.

A reversible motor 68, when energized, operates the cutter 21. FIGS. 4, 5 and 6 best illustrate the cutter which is provided specially to avoid damaging the film.

The cutter 21 employs a rotary blade 70 movable across the full width of the film in engagement with an elongate stationary straight edge 71. A block 72 supports the stationary edge 71; both extend the entire film width. As seen best in FIG. 6, the support block 72 and the straight edge 71 are directly below pinch rolls 35 and 36. Supported at its edges by the block 72, a film guide 73 receives the film as it emerges from the nip of the rolls 35 and 36 and guides the film past the stationary straight edge.

The rotary knife 70 is supported by a carriage 74 mounted for translation along a pair of guide bars 75 and 76. The carriage 74 has an upper slide block 77 with two bores 78 and 79 receiving the guide bars 75 and 76, respectively. Bores 78 and 79 house bushings 81 therein which ride on the bars 75 and 76 as the carriage 74 is driven across the width of the film.

Affixed to the carriage 72, a shaft 82 supports the rotary knife 71 for rotation in association with the straight edge 71 as the carriage 74 moves along the bars 75 and 76. The motor 68 drives the carriage 74 via a chain drive. The drive includes a first sprocket 83 connected with the output shaft of the motor 68, a drive chain 84 extending parallel the path of carriage movement, and an idler sprocket 85 about which the chain 84 is entrained. A pair of connectors 86 connects the chain 84 to the carriage 74 to move the carriage with the chain.

The prevent wrinkling or other damage to the film during cutting, the knife 70 rotates as it moves across the film, as though it were rolling. Thus, the only forces the knife 70 applies to the film 18 are normal to the film surface. This rolling action is provided by a gear 87, supported on the knife support shaft 82 and keyed to the knife 70 for rotation with the knife. An undercarriage 88 supports a shaft 90. A further gear 91 on the shaft engages with the gear 87. The shaft 90 also supports a larger gear 92, keyed to the gear 91. An elongate front plate 94 supports a rack 93 in a slot 95 formed across the inner face of the plate. The rack 93 extends parallel to the path of movement of the carriage and knife and engages the gear 92.

As the carriage 74 moves along the guide bars 75 and 76, the gear 92 meshes with the rack 93, rotating both gears 92 and 91. The gear 91, of course, drives the gear 87 and the rotary knife 70 to impart the desired rotary movement to the knife.

Movement of the knife 70 fully across the film 18 frees the film segment 12 for movement with the vacuum platen 11 away from the film loading platen position. As best seen in FIG. 6, during loading, the upper edge of the platen 11 is spaced shortly from the line along which the knife 70 cuts the film. A pair of film guides 96 and 97, affixed to block 72 and platen 11, respectively, bridge the slight gap between platen 11 and the straight edge 71 to guide the leading film edge onto the platen 11. Once severed, a free film edge extends slightly above the platen 11 and its guide 97. This edge conveniently allows automatic removal of the film segment later.

To move the platen 11 and film segment 12 for initial exposure, the X and Y direction pulse motors 32 and 27 are pulsed as required to register the desired section of the film segment with the cathode ray tube and lens. These motors, too, may be energized by pulse trains scheduled for maximum acceleration. With the film segment 12 correctly positioned, the tube 10 reproduces the information to be recorded, for example a line of text. Motors 27 and 32 reposition the film segment again and again for repeated exposures until all desired information has been recorded. The motors 27 and 32 then position the platen 11 directly beneath the film export device 22 for withdrawal of the film segment from the platen. As the upper free edge of the film segment 12 is moved toward the nip of a pair of film withdrawal pinch rolls 100 and 101, these rolls separate to accept the film.

FIGS. 7 and 8 best show the film export device. The pinch roll 100 is a metal drive roll supported between a pair of end plates 102 and 103, and the pinch roll 101 is a rubber or rubber faced driven roll supported at its ends in pivotable mounting brackets 104 and 104', much like the brackets 34 and 34' described above. The bracket 104 is connected with a shaft 105 rotatably mounted in the end plate 103. A solenoid 106, when energized, withdraws the roll 101 by pivoting the bracket 104 as the free film edge approaches the nip of the pinch rolls 100 and 101. A shaft 107, a connector 108, and a solenoid actuated drive bar 109 interconnect the solenoid and bracket to pivot the bracket on command. Again, a return spring 111 extends from a stud 112 on the bracket 104 to a stud 113 on the end plate 103. The spring 111 biases the movable pinch rolls 101 into engagement with the film when the film end is received between the pinch rolls.

With the free film end pinched between the rolls 100 and 101, the valve 65 closes the vacuum supply line 66, freeing the film segment 12 from the face of the vacuum platen 11. Energization of a drive motor 114 drives the pinch roll 100 to withdraw the film from the platen. A motor support plate 115 mounts the motor 114 a distance from the end plate 103. A belt 116 spans two pulleys 117 and 118, affixed respectively, to the output shaft of the drive motor 114 and to a drive shaft 120 keyed to the drive roll 100. Here too, a belt tension adjusting roll may be used if desired.

A gear 121 attached to the drive shaft 120 drives a gear 122 to rotate one of a pair of exit pinch rolls 123 and 124. A pair of film guides 125 and 126 extends from the nip of the rolls 100 and 101 to the nip of the rolls 123 and 124 to guide the film segment 12 on its way from the first pinch roll pair to the exit pinch roll pair.

The exit rolls 123 and 124 are similar to the rolls 100 and 101. They deliver the film out of the combined film handling and positioning apparatus. At the exit of rolls 123 and 124 a further cassette may be stationed to store the fully exposed film segments or the segments may be delivered directly to film processing apparatus.

From the foregoing, it will be seen that the method and apparatus described expeditiously supplies accurately measured film segments, cuts the segments free with little or no film abuse, repeatedly positions the film for exposure, and delivers the exposed film for storage or processing. All the drive arrangements are suitable for energization from a previously programmed computer or a computer controlled input signal source and, thus, the film handling and positioning apparatus may be controlled in cooperation with the control of the cathode ray tube 10. Each following cycle of operation is like the cycle described, with the exception that the feed pinch rolls 25 and 26 need not be separated again until a new supply of undeveloped film is required.

The X-axis and Y-axis positioning apparatus 16 allows film position control as accurate as may be needed for any particular photocomposition process. For example, a ⅛ point displacement capability is achieved in both X and Y directions by the employment of commercially available pulse motors requiring 200 pulses per revolution, coupled to lead screws having a pitch of .344575 inch per revolution. This degree of accuracy allows very precise positioning of text for a wide range of print sizes and styles.

While the preferred form of the invention has been described in detail above, it will be apparent to those skilled in the art that many alterations and modifications may be made without departure from the spirit and scope of the invention as defined in the appended claims. For example, while motors 27, 32 and 37 have been described as pulse motors, it will be understood that known servo devices with feedback correction may be substituted and may, in fact, give faster operation. However, these devices and their associated controls add complexity and increase cost.

I claim:

1. The method of handling a film for use in a photocomposition process including providing a supply of unexposed film, providing a film segment support member, separating one unexposed film segment from the supply, placing the unexposed film segment on the support member, automatically locating the support member and film segment for selective exposure of a predetermined portion of the film segment, and withdrawing the selectively exposed film segment from the support member, the step of placing including providing an electrically operable automatic film feed, and the step of withdrawing including providing an electrically operable automatic film withdrawal device, the step of automatically locating including providing an electrically operable support member drive for moving the support member and film segment in mutually perpendicular X and Y directions, applying electrical control signals to the drive to move the support member and film segment in the X and Y directions as a function of the applied control signals, applying initial control signals to the support member drive automatically to move the support member to the film feed for receiving the film segment thereon before exposure, and applying final control signals to move the support member and film segment to the withdrawal device for removal of the film segment.

2. The method according to claim 1, wherein the step of placing includes automatically electrically operating the film feed when the film support member has been moved thereto, and the step of withdrawing includes automatically electrically operating the film withdrawal device when the support member has been moved thereto.

3. The method according to claim 1, wherein the step of providing a support member drive includes providing an X direction pulse motor drive coupled to the support member, providing a Y direction pulse motor drive coupled to the support member, and the step of locating includes applying a predetermined number of pulses to the X and Y direction pulse motor drives to move the support member a predetermined distance in mutually perpendicular X and Y directions for each pulse applied to the X and Y direction drives, respectively.

4. The method according to claim 1, further including the step of applying vacuum to the film segment on the support member to hold the film segment thereon.

5. The method according to claim 4, wherein the step of withdrawing includes the steps of releasing the vacuum applied to the film segment, and automatically seizing an edge of the film segment.

6. The method of handling film for use in a photocomposition process including providing a supply of unexposed film, providing a film segment support member, separating one unexposed film segment from the supply, placing the unexposed film segment on the support member, automatically locating the support and film segment for selective exposure of a predetermined portion of the film segment, and withdrawing the selectively exposed film segment from the support member, the step of withdrawing including automatically seizing a free film segment edge to remove the film from the support member, and the step of placing including locating a film segment edge free of the support member for later seizure during withdrawal.

7. The method according to claim 6, wherein the step of withdrawing includes providing a pair of film export pinch rolls, moving at least one of the pinch rolls away from the remaining roll, inserting the free film edge between the rolls, closing the rolls on the edge, and then rotating the pinch rolls to withdrawn the film segment from the support member.

8. The method according to claim 6, wherein the step of placing includes supplying a precise amount of film from a continuous film store.

9. The method according to claim 8, wherein the step of supplying includes providing an electrically operable film supply device, and energizing the film supply device by a predetermined electrical signal to withdraw an amount of film having a length which is a function of the electrical signal.

10. The method according to claim 9, wherein the step of providing a film supply device includes providing a pulse motor drive, and applying a predetermined number of pulses to the pulse motor drive to determine the exact length of film supplied.

11. The method according to claim 8, wherein the step of separating one film segment includes automatically severing an exact length of the film supplied from the continuous store.

12. The method according to claim 11, wherein the step of severing includes driving a rotary knife across the film while rotating the knife to apply forces substantially only normal to the film surface.

13. The method of film handling for use in a photocomposition process including providing a film segment support member, electrically driving a pair of pinch rolls to supply an amount of film from a continuous film store onto the support member, applying vacuum to the film on the member to hold the film in place thereon, electrically actuating a rotary knife to move across the film and sever the film on the support member from the film in the store, moving the support member and film segment in mutually perpendicular X and Y directions to position each desired portion of the film segment for exposure, and electrically driving a pair of pinch rolls to withdraw the film segment from the support member.

14. The method according to claim 13, wherein the step of moving the support member includes producing a number of pulses representative of the amount of movement desired in the X direction, producing a number of pulses representative of the amount of movement desired in the Y direction, and moving the support member in the X and Y directions the distances represented by the respective number of pulses.

References Cited

UNITED STATES PATENTS

| 3,045,540 | 7/1962 | Caps, et al. | 355—28 X |
| 3,185,026 | 5/1965 | Carlson et al. | 355—41 X |
| 3,260,153 | 7/1966 | Abbott, Jr. et al. | 355—73 X |
| 3,276,312 | 10/1966 | Florsheim, Jr. et al. | 355—73 X |
| 3,282,150 | 11/1966 | Burton | 355—28 |
| 3,536,401 | 10/1970 | Mason et al. | 355—73 X |

SAMUEL S. MATTHEWS, Primary Examiner

R. A. WINTERCORN, Assistant Examiner

U.S. Cl. X.R.

95—12; 355—20, 29, 43, 53